United States Patent
Garcia et al.

(10) Patent No.: US 10,252,685 B2
(45) Date of Patent: Apr. 9, 2019

(54) OPTIMIZED POWERTRAIN CONTROL MODULE BRACKET

(71) Applicant: Ford Global Technologies, LLC, Dearborn, MI (US)

(72) Inventors: Daniel Ortiz Garcia, Mexico City (MX); Kristian Ulyses Flores Avina, Mexico City (MX); Everardo Sanchez Nunez, Mexico City (MX); Francisco Gomez Mata, Mexico City (MX); Ibrahim Chong Reyes, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 115 days.

(21) Appl. No.: 15/433,472

(22) Filed: Feb. 15, 2017

(65) Prior Publication Data
US 2018/0229668 A1  Aug. 16, 2018

(51) Int. Cl.
*A47F 5/00* (2006.01)
*B60R 16/02* (2006.01)

(52) U.S. Cl.
CPC .................. *B60R 16/02* (2013.01)

(58) Field of Classification Search
USPC ...................... 248/309.1, 674, 200, 554, 637
See application file for complete search history.

(56) References Cited

U.S. PATENT DOCUMENTS

| | | | | |
|---|---|---|---|---|
| 5,547,036 | A * | 8/1996 | Gawaskar | B60R 16/04 180/68.5 |
| 6,216,811 | B1 * | 4/2001 | Herc | B60R 16/04 180/68.5 |
| 6,290,013 | B1 * | 9/2001 | Bienenstein, Jr. | B60R 16/04 180/68.5 |
| 6,717,051 | B2 | 4/2004 | Kobayashi et al. | |
| 6,827,169 | B1 * | 12/2004 | Van Hout | B60R 16/04 180/68.5 |
| 7,198,097 | B2 * | 4/2007 | Powers | F28F 9/02 165/173 |

(Continued)

FOREIGN PATENT DOCUMENTS

| | | |
|---|---|---|
| CN | 202321138 | 7/2012 |
| CN | 204095718 | 1/2015 |
| KR | 0177480 | 4/1999 |

*Primary Examiner* — Monica E Millner
(74) *Attorney, Agent, or Firm* — LeClairRyan

(57) ABSTRACT

A bracket for supporting a vehicle control module, such as a powertrain control module, is disclosed. The bracket includes a body having a base wall, nodes or support posts, and side walls. The base wall includes back and module-receiving sides. An array of intersecting ribs is formed on the back side while at least one array of honeycomb segments is formed on the module-receiving side. At least one of the honeycomb segments includes a top layer. Substrate attachment arms extend outwardly from the side walls. Support posts extend from the back side of the base wall. Three intersecting ribs are provided, generally forming a triangle. One or more additional ribs may be provided. The intersecting ribs are hollow. The individual ribs function as structural beams that connect to and thus work in conjunction with the nodes or support posts and the honeycomb to provide optimum stiffness to the bracket.

20 Claims, 6 Drawing Sheets

(56) References Cited

U.S. PATENT DOCUMENTS

| | | | | |
|---|---|---|---|---|
| 7,469,763 B2* | 12/2008 | Dupuis | ............... | B60R 16/04 |
| | | | | 123/198 E |
| 8,474,559 B2* | 7/2013 | Sogabe | ............... | B60R 16/04 |
| | | | | 180/68.5 |
| 8,668,238 B2 | 3/2014 | Kuwano et al. | | |
| 8,835,033 B2 | 9/2014 | Choi et al. | | |
| 9,073,498 B2* | 7/2015 | Lee | ............... | B60R 16/04 |
| 9,222,734 B2* | 12/2015 | Ranes | ............... | F28F 9/0224 |
| 9,276,243 B2* | 3/2016 | Templeman | ............... | H01M 2/1083 |
| 2009/0273916 A1* | 11/2009 | Hironaka | ............... | B60K 6/28 |
| | | | | 361/830 |
| 2010/0326395 A1* | 12/2010 | Lohr | ............... | F02M 35/10045 |
| | | | | 123/198 E |
| 2013/0122339 A1* | 5/2013 | Chae | ............... | B60L 11/1879 |
| | | | | 429/99 |
| 2013/0252059 A1* | 9/2013 | Choi | ............... | B29C 70/20 |
| | | | | 429/100 |
| 2013/0278050 A1* | 10/2013 | Maier | ............... | B60T 8/3685 |
| | | | | 303/113.2 |
| 2014/0060918 A1 | 3/2014 | Kushima et al. | | |
| 2016/0368442 A1* | 12/2016 | Dubey | ............... | B60R 19/52 |
| 2017/0133702 A1* | 5/2017 | Takahashi | ............... | H01M 8/2485 |

* cited by examiner

US 10,252,685 B2

OPTIMIZED POWERTRAIN CONTROL MODULE BRACKET

TECHNICAL FIELD

The disclosed inventive concept relates to brackets for vehicle electronics modules in general. More particularly, the disclosed inventive concept relates to a bracket for a powertrain control module for a vehicle that is optimized for stiffness performance and fatigue resistance under a variety of road conditions. The disclosed powertrain control module bracket has an array of body ribs, nodes or support posts and a honeycomb construction. The individual ribs of the rib array function as structural beams that connect to the nodes or support posts and the honeycomb and thus work in conjunction with the nodes or support posts and the honeycomb to provide optimum stiffness to the bracket.

BACKGROUND OF THE INVENTION

It is increasingly common for an automotive vehicle to utilize a centralized electronics control module. Such modules incorporate electronic circuits that regulate and route electronic signals to selected components throughout the automobile. The functions of these modules may include, for example, circuit breakers, windshield wiper circuits, interior chime circuitry, power window circuitry, door lock circuitry, and an array of fuses and relays. These types of control modules are typically located in the instrument panel area, thereby allowing easy accessibility from both the engine compartment and the vehicle interior.

However, not all control modules are located in the area of the instrument panel. For example, powertrain control module, or the PCM, is not so positioned. The PCM is a control module that is the "brain" of the vehicle and, as such, conventionally incorporates multiple control units, such as the engine control unit (the ECU) and the transmission control unit (the TCU). Accordingly, with respect to engine operation, the PCM typically controls ignition, fuel injection and emission.

Because of its operational relationship with the engine and transmission, the PCM is mounted in a variety of locations proximate to these components, including the dashboard support panel and under the engine hood in the engine compartment where it is often but not exclusively attached to a sheet metal body structure. The location of the PCM is dictated by certain conditions including space and service accessibility. Accordingly, the final position of the PCM varies from vehicle to vehicle. If positioned under the engine hood, the PCM may be fixed to locations such as the firewall, the wheel well or the battery bracket and, in certain cases, to the engine itself. Typically, the PCM includes a mounting bracket that allows for firm mounting to the selected mounting surface. The bracket is conventionally attached by, for example, mounting bolts.

Known PCM mounting brackets are typically formed from sheet metal although certain applications where waterproofing, anti-theft protection and weight reduction are desired require that the bracket be formed from a rigid plastic such as ABS (acrylonitrile butadiene styrene) plastic. When formed from a plastic, known brackets offer suffer from defects such as undesirable weld lines, white marks, sink marks and warpage due to the molding process. Given its strategic location on engine compartment walls or on other structural elements, the PCM is required to endure dynamic road loads that risk damage to the PCM bracket. Such damage typically arises in the form of failure cracks that appear over its superior surface. It has been identified that the maximum Von Mises stress of some bracket designs was higher than the yield stress of the plastic material (for example, 42 MPa of polypropylene PPTV20). In this case, the component was subjected to levels of stress that were too high resulting in some areas that experience plastic (permanent) deformation during CAE simulations. As a result of the situation in which the support bracket for the PCM may fail in some extreme cases, engine and drivetrain failure are both possible.

In view of the limitations of known metal and plastic brackets having a recessed area for a module due to the above-noted undesirable characteristics, a new approach mounting a PCM to a vehicle to prevent structural failure is needed.

SUMMARY OF THE INVENTION

The disclosed inventive concept overcomes the challenges faced by known arrangements for PCM support structures by providing a bracket formed from a polymerized material that is easily manufactured, is tunable for different environments and different modules, is durable and is resists water ingress. Because of its construction and the material from which it is formed, the PCM bracket makes the quick and easy theft of the module itself difficult. In addition, the PCM bracket demonstrates structural durability under acceleration due to road load. The bracket includes an array of stiffening body ribs and honeycomb structures, thereby optimizing structural rigidity and integrity with nominal wall thickness, thus avoiding the need for additional material. The PCM support structure of the disclosed inventive concept may be of a variety of shapes and sizes with the common construction including a combination of the array of ribs and an associated honeycomb, thus providing for its tunability. In some instances, a significant weight reduction can be achieved without compromising bracket strength depending on such variables as the specific bracket design and its location on the vehicle as well as on the weight of the PCM being supported.

The PCM bracket of the disclosed inventive concept includes a bracket body having a base wall and side walls extending from the base wall. The base wall includes a back side and a module-receiving side. A rib array comprising a plurality of interconnected ribs is formed on the back side of the base wall while at least one array of honeycomb segments is formed on the module-receiving side of the base wall. In the event there are two or more honeycomb segments, the depths of at least two of such segments may be different. At least one of the honeycomb segments may include a top layer, thereby inclosing the individual honeycomb cells. The bracket further includes nodes or support posts. The individual ribs of the rib array function as structural beams that connect to and thus work in conjunction with the nodes or support posts and the honeycomb to provide optimum stiffness to the bracket.

One or more substrate attachment arms extend outwardly from the side walls of the bracket body. At least one support post may extend from the back side of the base wall. At least three intersecting ribs are be provided, generally forming a triangle. Two or more triangles may be provided with the number of triangles being determined by the number of nodes. The support post may extend from the intersection of two of these three intersecting ribs. One or more additional ribs may be provided. To achieve maximum weight reduction without compromising structural integrity, one or more of the intersecting ribs may be hollow. The bracket further includes module attachment structures extending from the module-receiving side of the base wall.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 3 is a perspective view of the PCM bracket according to the disclosed inventive concept viewed from its top or module-receiving side;

DETAILED DESCRIPTION OF THE PREFERRED EMBODIMENT

Figure 1:
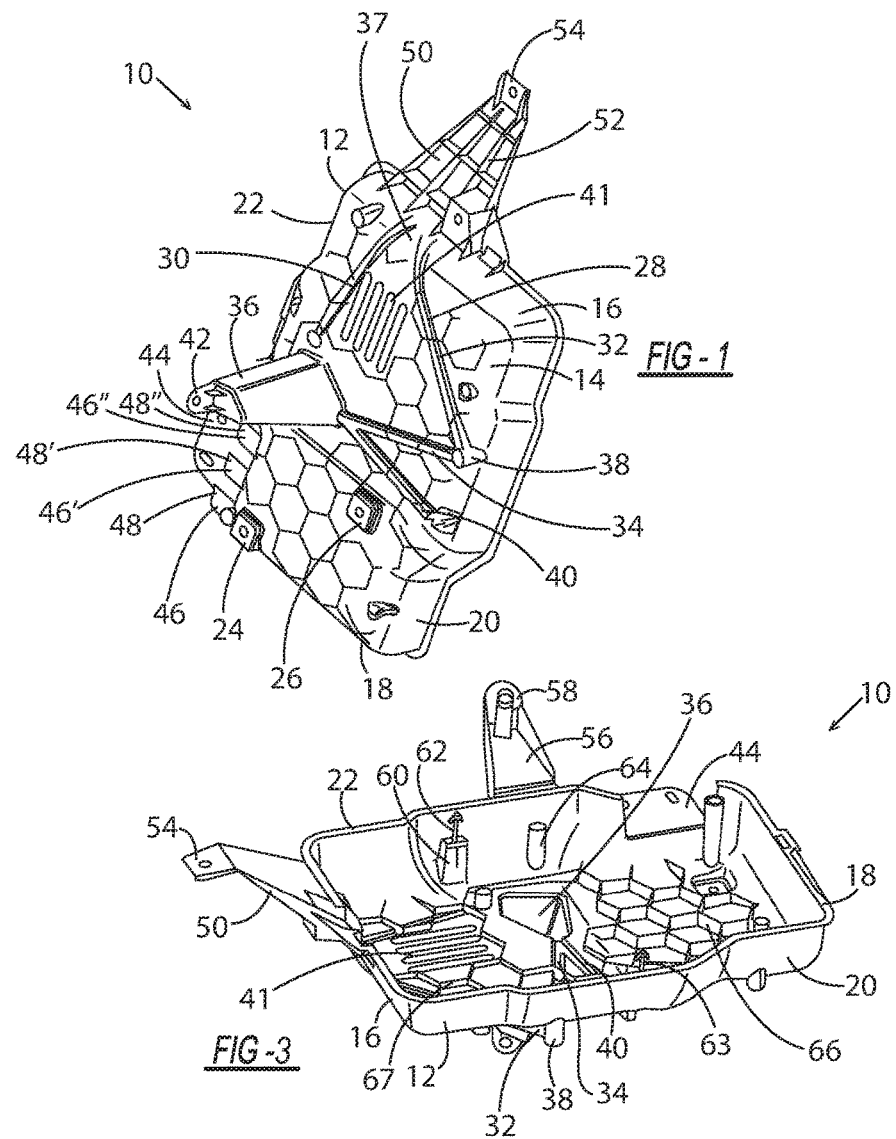
FIG. 1 is a perspective view of the PCM bracket according to the disclosed inventive concept viewed from the underside of the bracket.

In the following figures, the same reference numerals will be used to refer to the same components. In the following description, various operating parameters and components are described for different constructed embodiments. These specific parameters and components are included as examples and are not meant to be limiting.

The accompanying figures illustrate a bracket for a PCM according to the disclosed inventive concept. The illustrated bracket may be adapted for a variety of uses beyond the preferred use for isolating and supporting a PCM. In addition, it is to be understood that while the accompanying figures illustrate the preferred embodiment of the bracket, other variations of the bracket may be possible without deviating from the spirit or scope of the disclosed inventive concept. For example, the space in which the control module is fitted may be deeper. The array of supporting structures such as the ribs and the honeycombs may be varied. The length and width of the bracket may also be varied as needed to satisfy a particular attachment environment. Accordingly, it is to be understood that the disclosed concept is suggestive only as other variations may be possible.

Figure 2:
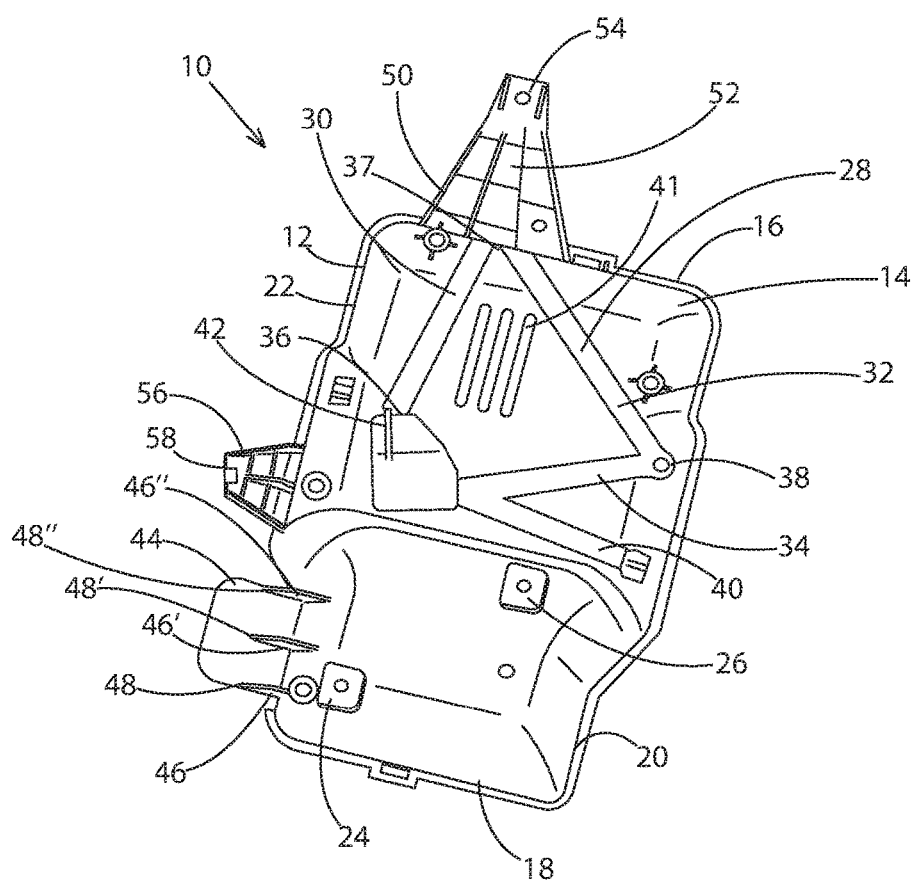
FIG. 2 is a plan view of the PCM bracket according to the disclosed inventive concept viewed from the underside of the bracket.

Referring to FIGS. 1 and 2, different views of a PCM bracket according to the disclosed inventive concept viewed from the underside of the bracket are shown. The bracket, generally illustrated as 10, may be formed from a variety of materials, preferably including a nonconductive polymerized material that is relatively easy to mold and will not rust. The bracket 10 includes a bracket body 12 having a base wall 14, a back wall 16, a front wall 18, a first side wall 20 and a second side wall 22. A number of fastener bosses such as fastener boss 24 and fastener boss 26 are formed on the base wall 14.

Also formed on the base wall 14 is an array of strengthening body ribs that, in part, form a triangular rib array 28 that comprises a first rib 30, a second rib 32, and a third rib 34. The first rib 30 and the second rib 32 extend at one end over and onto the back wall 16. The apex of one end of the first rib 30 and one end of the second rib 32 defines a node 37. The other end of the first rib 30 substantially extends to a node or support post 36 that extends outwardly from the base wall 14. The other end of the second rib 32 and one end of the third rib 34 meet at a node or support boss 38. The apex of the other end of the third rib 34 and the other end of the third rib 34 meet at the node 36. A fourth rib 40 connects with and extends away from the node 36. A greater or lesser number of ribs may be incorporated as required to optimize the structural integrity of the bracket 10.

It is known for the PCM to generate heat during operation. It is thus desirable to allow for cooling of the module. Accordingly, cooling slots 41 are preferably formed through the base wall 14. A greater or lesser number of cooling slots may be provided. The cooling slots may also be of shapes and sizes other than those illustrated.

In addition to the fastener bosses 24 and 26, the bracket 10 includes other attachment structures for attaching the bracket 10 to the vehicle. Those that are illustrated and are discussed hereafter are not intended as being limiting as the placement and number of attachment structures may be varied as needed without deviating form the spirit or scope of the disclosed inventive concept.

As a preferred attachment structure, the node 36 includes an attachment tab 42. One or more additional attachment tabs may be provided. In addition, an attachment bracket 44 having bracket ribs 46, 46' and 46" may be provided. Each rib defines a draft angle at its area of contact with the attachment bracket 44. Particularly, the bracket rib 46 includes a draft angle 48, the bracket rib 46' includes a draft angle 48', and the bracket rib 46" includes a draft angle 48".

One or more additional attachment structures may be provided for attaching the bracket 10 to the vehicle. For example, and as shown in FIGS. 1 and 2, a first attachment arm 50 extends outwardly from the back wall 16. The attachment arm 50 preferably includes a series of reinforcing ribs 52 formed thereon. The attachment arm 50 further includes an attachment tab 54.

Figure 4:
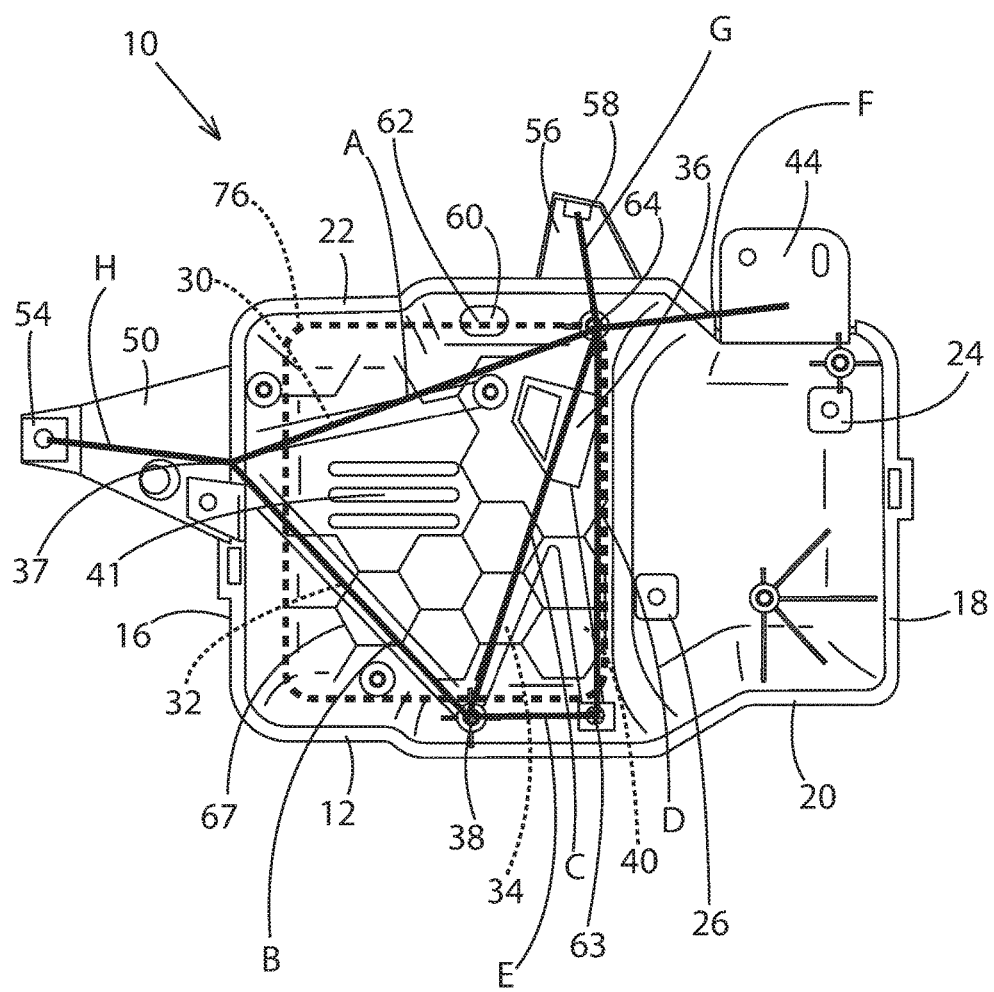
FIG. 4 is a plan view of the PCM bracket according to the disclosed inventive concept viewed from its top or module-receiving side.

As noted, additional structures may be provided for added attachment security. Referring to FIGS. 3 and 4 in which different views are shown of the bracket 10 from its top or module-receiving side, a second attachment arm 56 extends outwardly from the second side wall 22. The attachment arm 56 includes an attachment tab 58.

Attachment of the PCM to the module-receiving side of the bracket 10 may be made by a variety of arrangements. Preferably, but not exclusively, an attachment boss 60 is provided having an attachment tab 62 extending therefrom. An attachment tab 63 extending from an attachment boss (not shown) may also be provided. A further support post or node 64 may be provided. A greater or lesser number of attachment tabs for fixing the PCM may be provided in the same or different locations compared with the illustrated points of attachment.

To minimize weight while maximizing structural integrity, the node 36 and the ribs 30, 32, 34 and 40 may be substantially hollow as illustrated in FIGS. 3 and 4. For example, undersides of the second rib 34 and the fourth rib 40 are illustrated as defining channels. Similarly, the inside of the node 36 is illustrated as being hollow.

To further minimize weight while maximizing structural integrity, a first honeycomb structure 66 and a second honeycomb structure 67 is formed on the module-receiving side of the bracket 10. The honeycomb structures 66 and 67 contribute to the enhancement of bracket performance at dynamic loads. These structures help to increase local stiffness without increasing nominal thickness, which improves the stiffness of the component but does not impact significantly on total assembly weight. While as a general matter the number and size of the individual honeycomb cells as shown in FIGS. 3 and 4 is only suggestive and is not intended as being limiting, it is noted that the first honeycomb structure 66 and the second honeycomb structure 67 may be the same or may be different. For example, and referring to FIGS. 5 and 6, a closed version of the honeycomb structure is illustrated such as might be the arrangement for the first honeycomb structure 66.

The rib array 28 comprising the first rib 30, the second rib 32, the third rib 34 and the fourth rib 40 connect with and thus work in conjunction with the nodes 37, 36, and 38 and the honeycomb structures 66 and 67 to provide greater stiffness to the bracket 10. This increased stiffness provides greater structural integrity and durability to the bracket 10 without the need of having to increase the thickness of any of the walls or of the supporting posts. More particularly and as noted previously, individual ribs 30, 32, 34 and 40 of the rib array 28 function as structural beams A, B, C, D, E, F, G and H shown in FIG. 4 that connect to and thus work in conjunction with the nodes 37, 36, and 38 and the honeycomb structures 66 and 67 to provide optimum stiffness to the bracket.

More particularly, and referring to FIG. 4, the beam A is defined by the combination of the node 37, the first rib 30, and the node 64. The beam B is defined by the combination of the node 37, the second rib 32, and the node 38. The beam C is defined by the combination of the node 38, the third rib 34, and the node 64. The beam D is defined by the node 64, the fourth rib 40, and the attachment tab 63. The beam E is defined by the node 38, the attachment tab 63, and the structure of the portion of the base wall 14 spanning the distance between the node 38 and the attachment tab 63. The beams A, B and C form a first triangle while the beams C, D and E form a second triangle. As the number of triangles is determined by the number of nodes, additional triangles may be formed if additional nodes are provided. The beam F is defined by the node 64, the attachment bracket 44, and the portion of the base wall 14 spanning the distance between the node 64 and the attachment bracket 44. The beam G is defined by the node 64, the attachment tab 58, and the portion of the base wall 14 spanning the distance between the node 64 and the attachment tab 58. And the beam H is defined by the node 37, the attachment tab 54, and the portion of the base wall 14 spanning the distance between the node 37 and the attachment tab 54.

Figure 5:
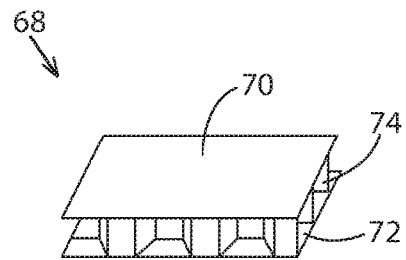
FIG. 5 is a perspective view of a segment of a honeycomb structure of a wall of the PCM bracket according to the disclosed inventive concept.
Figure 6:
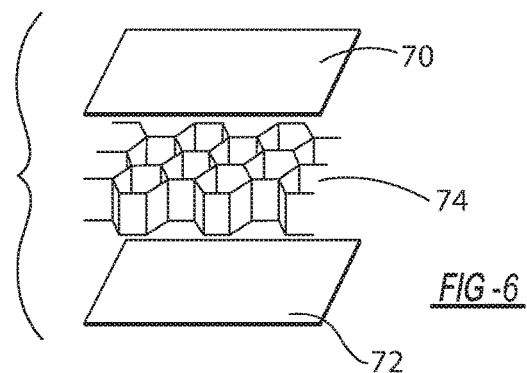
FIG. 6 is an exploded view of the segment of the honeycomb structure illustrated in FIG. 5.

A section of the honeycomb structure 66 is illustrated in FIG. 5 in which a honeycomb segment 68 is illustrated having a relatively thin upper layer 70, a relatively thin lower layer 72, and an array of honeycomb segments 74 sandwiched between the upper layer 70 and the lower layer 72. The lower layer 70 is also the base wall 14. The upper layer 70 is optional but is preferred. FIG. 6 illustrates the upper layer 70, the lower layer 72 and the intermediate array of honeycomb 74 segments.

Figure 7:
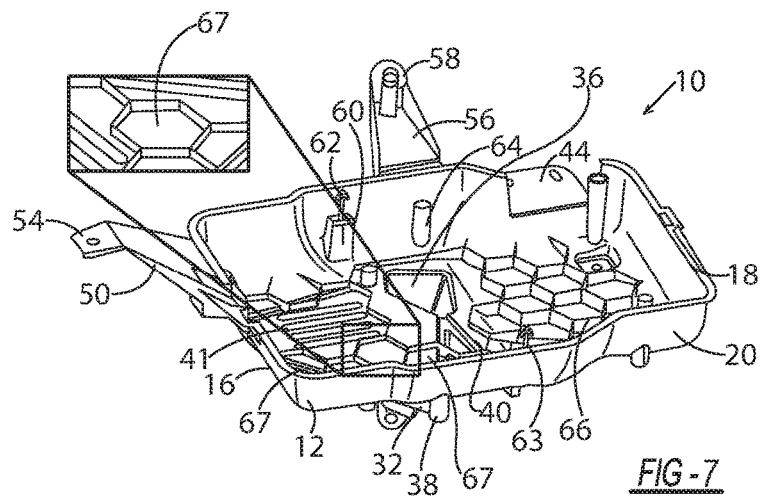
FIG. 7 is a perspective view of the top or module-receiving side of the PCM bracket according to the disclosed inventive concept having a close-up view detailing the honeycomb array.

While the honeycomb segment 66 includes relatively deep honeycomb segments as illustrated in FIGS. 3, 5 and 6, this configuration is not mandatory and may be varied or tuned depending on the particular application. Referring to FIG. 7, a perspective view of the top or module-receiving side of the PCM bracket 10 according to the disclosed inventive concept illustrated and includes a close-up view of the honeycomb structure 67. As illustrated, the individual honeycomb segments of the honeycomb structure 67 are shallower, that is, the segment walls are not as tall as the walls of the honeycomb structure 66. The wall heights may be varied and honeycomb segments having wall heights greater or lesser than either of the walls of honeycomb structures 66 and 67 may be adopted.

Figure 8:
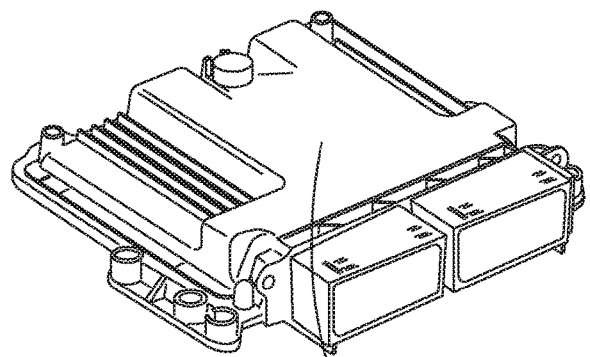
FIG. 8 is a perspective view of an exemplary module for use with the disclosed inventive concept.

FIG. 8 illustrates a perspective view of an exemplary PCM 76 for use with the bracket 10 of the disclosed inventive concept. It is to be understood that the shape and size of the module 76 illustrated in FIG. 8 is intended only as being suggestive and not as being limiting as modules having other shapes and sizes could easily be adapted for use with the bracket 10.

Figure 9:
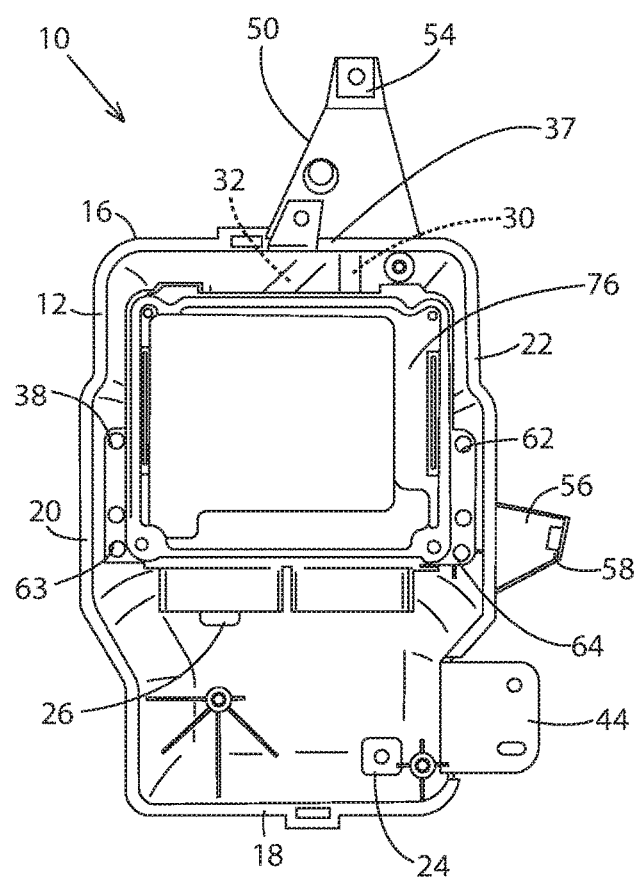
FIG. 9 is a plan view of the top or module-receiving side of the PCM bracket according to the disclosed inventive concept illustrating the PCM in position.

FIG. 9 illustrates a plan view of the top or module-receiving side of the PCM bracket 10 according to the disclosed inventive concept illustrating the module 76 in position on the bracket 10. While a single control module 76 is illustrated, it is possible that two or more individual modules may be fitted to the control module bracket 10.

While conventional metal bracket designs are based on linked beam connections between attachment points that define the topology of the bracket, the plastic control module bracket of the disclosed inventive concept are structurally reinforced by the provision of one or more body ribs that thereby increase the stiffness of the bracket, thus demonstrating better performance during cases of fatigue loaded. In addition, the honeycomb structures enhance performance at dynamic loads. This added feature helps to increase local stiffness without increasing nominal thickness, thereby improving component stiffness without significantly impacting total assembly weight. When combined, these features improve the bracket's structural performance and prevent failure thereby improving manufacturing feasibility and enhancing the primary function of the bracket which is to protect the PCM module when incorporated into the vehicle. The bracket of the disclosed inventive concept thus provides a robust design that is readily adaptable to a variety of shapes and configurations of both the environment and the module itself.

One skilled in the art will readily recognize from such discussion, and from the accompanying drawings and claims that various changes, modifications and variations can be made therein without departing from the true spirit and fair scope of the invention as defined by the following claims.

What is claimed is:

1. A bracket for a control module comprising:
   a bracket body having a base wall and side walls extending from said base wall, said base wall including back and module-receiving sides;
   a plurality of intersecting ribs formed on said back side of said base wall;
   a plurality of nodes to which said ribs attach;
   an array of honeycomb segments formed on said module-receiving side; and a substrate attachment arm extending from and fixed to one of said side walls.

2. The bracket for a control module of claim 1 including two spaced apart arrays of honeycomb segments.

3. The bracket for a control module of claim 2 wherein each of said two spaced apart arrays of honeycomb segments has a depth and wherein the depth of one of said arrays is greater than the depth of the other of said arrays.

4. The bracket for a control module of claim 1 further including a support post extending from said back side of said base wall.

5. The bracket for a control module of claim 4 wherein said support post is formed substantially at the intersection of two of said intersecting rib.

6. The bracket for a control module of claim 1 wherein three of said intersecting ribs are provided, said three ribs generally defining a triangle, said triangle defined by a first rib, a second rib and a third rib, a first node to which said first and second ribs attach, a second node to which said first and third ribs attach, and a third node to which said second and third ribs attach, said combination of said first node, said first rib, and said second node define a first beam, the combination of said first node, said second rib, and third node define a second beam, and the combination of said second node, said third rib and said third node define a third beam.

7. The bracket for a control module of claim 6 further including a fourth rib and a forth node to which said forth rib is attached.

8. The bracket for a control module of claim 1 wherein said intersecting ribs are hollow.

9. The bracket for a control module of claim 1 further including module attachment structures extending from said module-receiving side of said base wall.

10. The bracket for a control module of claim 1 wherein said array of honeycomb segments includes an upper layer, a lower layer, and a honeycomb segment sandwiched therebetween.

11. A bracket for a control module comprising:
a body having a side walls and a base wall having back and module-receiving sides;
a plurality of intersecting ribs formed on said back side, at least one of said plurality of intersecting ribs extending over and onto one of said side walls;
a plurality of nodes to which said ribs attach;
an array of honeycomb segments formed on said module-receiving side; and
an attachment arm extending from one of said side walls.

12. The bracket for a control module of claim 11 further including a support post extending from said back side of said base wall.

13. The bracket for a control module of claim 12 wherein said support post is formed substantially at the intersection of two of said intersecting ribs.

14. The bracket for a control module of claim 11 wherein three of said intersecting ribs are provided and generally define a triangle, said triangle defined by a first rib, a second rib and a third rib, a first node to which said first and second ribs attach, a second node to which said first and third ribs attach, and a third node to which said second and third ribs attach, said combination of said first node, said first rib, and said second node define a first beam, the combination of said first node, said second rib, and third node define a second beam, and the combination of said second node, said third rib and said third node define a third beam.

15. The bracket for a control module of claim 14 further including a fourth rib and a forth node to which said forth rib is attached.

16. The bracket for a control module of claim 11 wherein said intersecting ribs are hollow.

17. The bracket for a control module of claim 11 further including module attachment structures extending from said module-receiving side of said base wall.

18. The bracket for a control module of claim 11 wherein said array of honeycomb segments includes an upper layer, a lower layer, and a honeycomb segment sandwiched therebetween.

19. A bracket for a control module comprising:
a body having a base wall with back and module-receiving sides and side walls extending from said base wall, at least one cooling slot formed in said base wall;
a plurality of intersecting ribs formed on said back side of said base wall;
a plurality of nodes to which said ribs attach;
an array of honeycomb segments formed on said module-receiving side; and
a substrate attachment arm extending from one of said side walls.

20. The bracket for a control module of claim 19 wherein said plurality of ribs define a triangle, said triangle is defined by a first rib, a second rib and a third rib, a first node to which said first and second ribs attach, a second node to which said first and third ribs attach, and a third node to which said second and third ribs attach, said combination of said first node, said first rib, and said second node define a first beam, the combination of said first node, said second rib, and third node define a second beam, and the combination of said second node, said third rib and said third node define a third beam.

* * * * *